May 25, 1965

C. PRESS 3,185,244

DISK BRAKE

Filed July 9, 1963

CARL PRESS
INVENTOR.

BY *Mestern, Ross & Mestern*

CARL PRESS
INVENTOR.

BY Masters, Ross & Masters

United States Patent Office 3,185,244
Patented May 25, 1965

3,185,244
DISK BRAKE
Carl Press, Offenbach (Main), Germany, assignor to Alfred Teves K.G., Frankfurt am Main, Germany, a corporation of Germany
Filed July 9, 1963, Ser. No. 293,653
Claims priority, application Germany, Sept. 28, 1962, T 22,796
5 Claims. (Cl. 188—73)

My present invention relates to disk-type brakes and, more particularly, to segmental disk brakes having brake shoes disposed upon opposite sides of a rotatable disk for displacement into engagement with the latter to halt such rotation.

In a copending application, filed by me jointly with Friedrich Beuchler, Ser. No. 97,382, on March 21, 1961, there is described a segmental disk brake wherein the actuating means for the brake shoes comprises a lever floatingly mounted upon a support and/or one or more actuating cylinders coupled with the brake shoes in a similar manner. This type of brake has found wide-spread acceptance. Earlier disk-type brakes have, however, frequently had several important disadvantages deriving from the fact that the actuating means, for the most part, was not in a fixed relationship with the support. Thus, in systems wherein the actuating cylinder was floatingly positioned between the brake shoes (e.g. via a yoke or stirrup extending on opposite sides of the disk), it was impossible to provide a rigid fluid connection for the cylinder and it was necessary to resort to flexible tubes and the like to supply the latter with the pressure fluid. The use of flexible tubes was inconvenient and rendered the brake system prone to failure as a consequence of material fatigue since the tube was repeatedly bent upon actuation of the brake.

In a similar disk-brake system, the manual actuating means consisted of a lever floatingly mounted upon the support and thus requiring greater actuating forces and a relatively large number of articulations and link members.

It is an object of the present invention to provide a relatively simple disk-brake system suitable for manual and/or fluid operation wherein the aforementioned disadvantages can be avoided.

It is again the object of this invention to improve upon the brake system described in the above-identified copending application while extending the principles taught therein.

Yet a further object of this invention is to provide a disk brake having a self-reinforcing action and wherein the actuating means is fixedly positioned with respect to the brake support.

These objects, and others which will become apparent hereinafter, have been attained by providing a disk-type brake wherein a relatively stationary support extends along opposite sides of the rotatable brake disk and receives a pair of brake shoes movably mounted thereon for displacement toward the disk along its opposite sides while an actuating lever is pivotally mounted on the support for angular displacement about an axis fixed with respect to this support for displacing the brake shoes.

Advantageously, the actuating lever is provided with a first formation (e.g., a projection or finger) cammingly engageable with one of the brake shoes and with a similar second formation cammingly engageable with a yoke shiftable with respect to the support and bridging the opposite sides of the disk in engagement with the other brake shoe for displacing it toward the disk. The yoke preferably bears upon this other brake shoe in such manner as to pull it against the disk while the first-mentioned brake shoe is pushed thereagainst by the lever directly. This yoke can lie in a plane inclined to the disk but parallel to the pivotal axis of the actuating lever, the latter being swingable in a plane transverse to the plane of the yoke or stirrup and to the braking surface of the disk.

According to another feature of this invention, the support can be provided with guide means inclined toward said disk in the direction of rotation thereof along its opposite surfaces to form similarly inclined paths for the respective brake shoes. The brake shoes thus being wedged against the support by the rotation of the disk when they are brought into contact with the latter. It will be apparent that a self-reinforcement of the braking action will thus result. Advantageous, a cable, rod or the like can be provided to connect the actuating lever with a pedal or operating member by means of which the brake can be controlled manually. Moreover, a fluid-responsive cylinder can be provided fixedly on the support and formed with an inlet for the pressure fluid so that flexible tubes can be avoided in the absence of any motion of the cylinder with respect to the support. The movable one of the piston and cylinder members will, of course, be coupled with the actuating lever.

The above and other subjects, features and advantages of the present invention will become more readily apparent from the following description, reference being made to the accompanying drawing in which.

Figure 1:
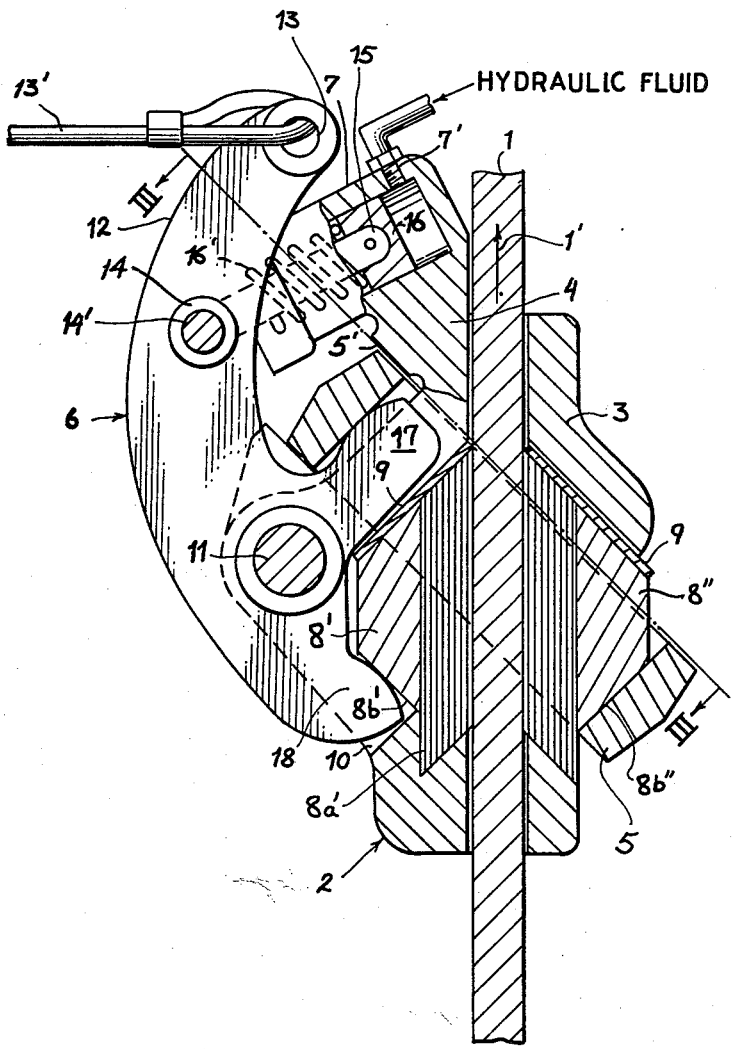
FIG. 1 is a side-elevational view, partly in section, of a disk brake embodying the present invention.
Figure 2:
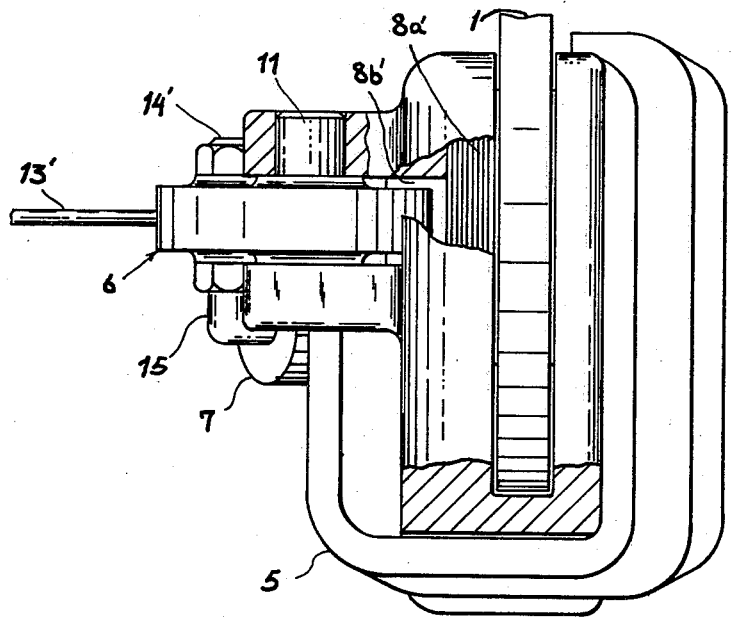
FIG. 2 is a rear-elevational view thereof, partly in section.
Figure 3:
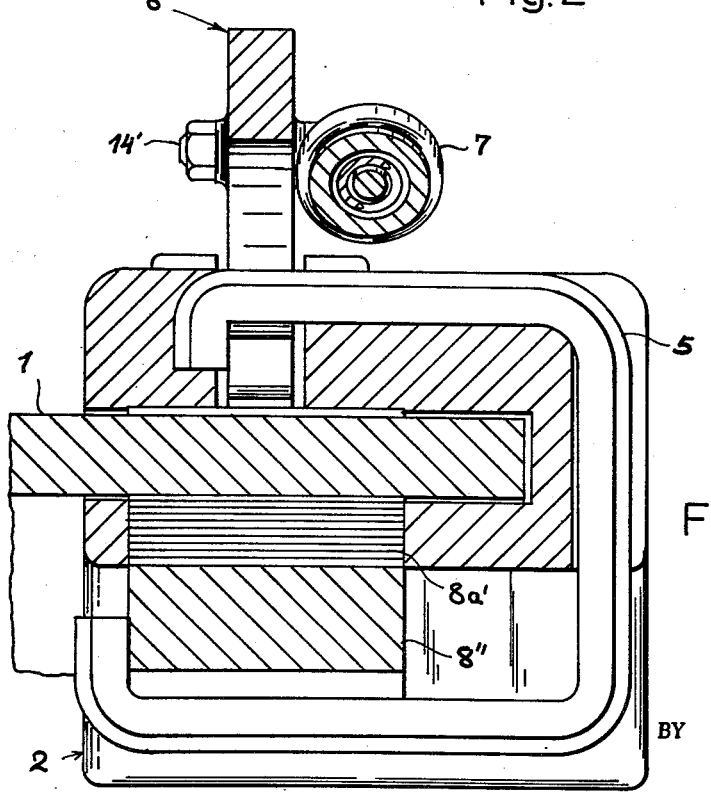
FIG. 3 is a cross-sectional view taken along the line III—III of FIG. 1.
Figure 4:
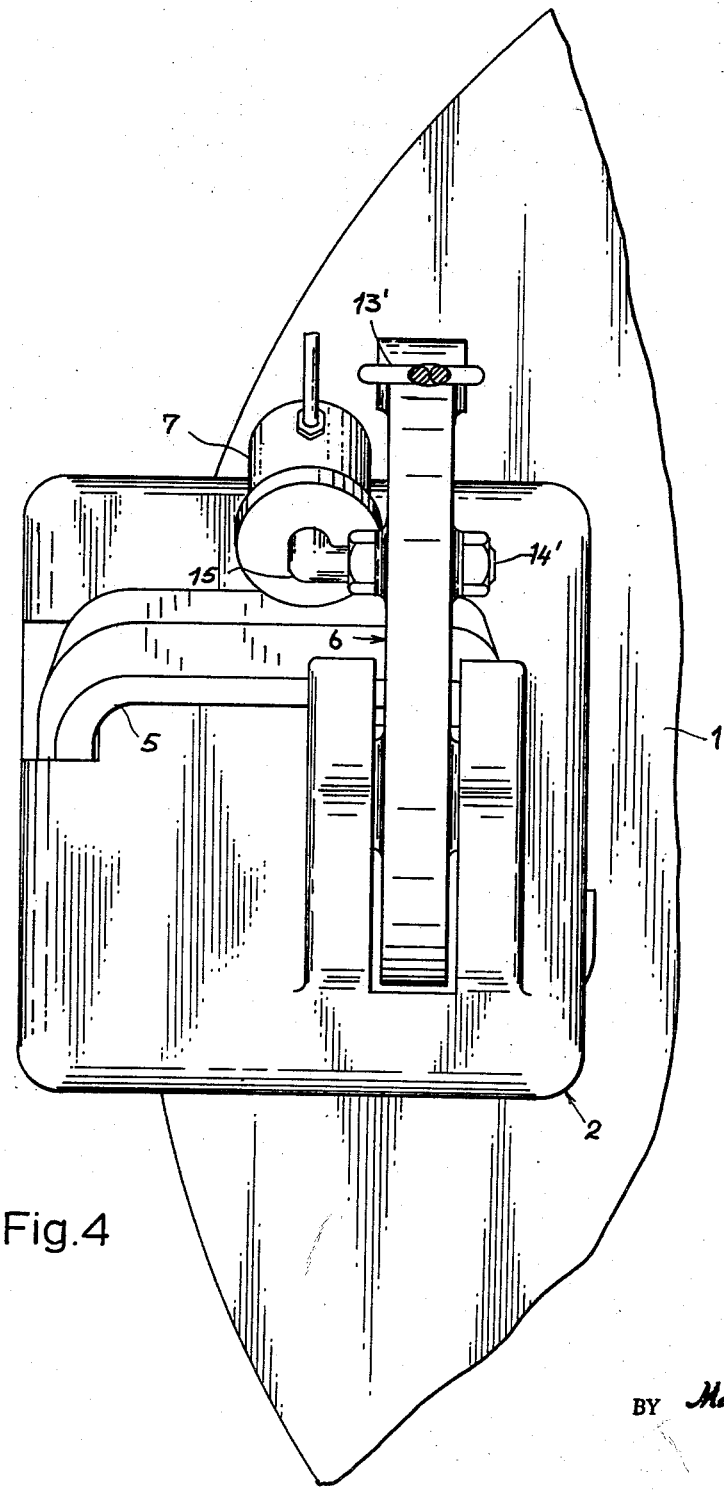
FIG. 4 is a plan view of the brake system.

In the drawing I show a portion of the brake disk 1 along a segment of which the brake housing 2 is provided. As will be apparent from FIGS. 2 and 3, the brake housing 2 extends along opposite sides of the disk 1 and has a portion 3 remote from the actuating means disposed along one side of the disk. The corresponding opposite portion 4 is provided with a pair of lugs 10, forming a fork between which the actuating lever 6 is journaled for rotation about an axis fixed with respect to the support 2 on a pin 11. An actuating cylinder 7 is formed integrally with support 2 and receives a piston 16 whose rod 15 is articulated to lever 6 at its eye 14 by a pin 14', a spring 16' serving to restore the actuating lever 6 to its disengaged position.

The lever 6 is also provided with an eye 13 at its control end 12, by means of which a cable 13' or some other link means can couple this lever with the pedal or other operating member for manual actuation of the brake. Lever 6 has a first projection or finger 18 which bears upon a brake shoe 8', whose lining 8a' is juxtaposed with the disk 1, and a second projection or finger 17 adapted to displace a yoke 5 bridging the opposite sides of the disk. The term "yoke" as used herein is intended to encompass all members forming a substantially rigid connection between the actuating lever on one side of the disk and a brake shoe on the other side thereof and passing around the periphery of the disk to bridge its opposite sides. It will be apparent, therefore, that a closed ring of sufficient dimensions can be used for this purpose and is included with a C-shaped stirrup within the present concept of a "yoke." Yoke 5 is guided in a channel 5' in support 2 and lies in a plane inclined to the disk and perpendicular to the plane of displacement of lever 6. Both portions 3, 4 of the support 2 are provided with respective guide means 9 within which brake shoes 8' and 8", the latter being shifted by the yoke 5, can be displaced along paths inclined to the disk 1 in the direction of its rotation (arrow 1'), so that the brake shoes are wedged against the disk by its rotation to reinforce the braking action. To obtain maximum efficiency upon the operation of the brake lever 6, yoke 5 is inclined to the disk 1 but parallel to the path of brake shoe 8'' while finger 17 extends transversely to the plane of the yoke. The path of brake shoes 8' and 8'' can include with each other an angle of about 90°, in which case fingers 17 and 18 will extend approximately at a right angle with respect to one another. To facilitate the displacement of the brake shoes, each of the latter can be provided with an abutment surface 8b', 8b'' perpendicular to its respective guide member 9 and at an angle of approximately 45° to the disk 1.

An inlet 7' for the cylinder 7 permits a hydraulic or pneumatic fluid to be introduced into the cylinder and to displace piston 16 to rotate lever 6 counterclockwise thereby shifting the brake shoes into engagement with the disk against the force of spring 16'. A similar displacement of lever 6 can be effected manually via a cable 13'.

The invention described and illustrated is believed to admit of many modifications within the ability of persons skilled in the art, all such modifications being considered within the spirit and scope of the appended claims.

I claim:

1. A disk brake comprising a rotatable brake disk; a relatively stationary support extending along opposite sides of said disk; a pair of brake shoes movably mounted on said support for displacement toward said disk on opposite sides thereof but in a common zone in the rotation path of said disk; guide means for each of said brake shoes defining therefor a respective guide path inclined to said disk in the direction of displacement thereof, said paths including an angle of less than 180° between them; an actuating lever pivotally mounted on said support for angular displacement in a plane transverse to said disk about a pivotal axis fixed with respect to the latter, said lever having a first formation rigid with said lever and in engagement with one of said brake shoes for urging it toward said disk upon displacement of said lever; and a yoke shiftable with respect to said support in a path inclined to said disk, said yoke bridging the opposite sides of said disk while engaging the other of said brake shoes, said axis being offset from the path of said yoke but parallel thereto said lever having a second formation rigid with said lever and engaging said yoke for displacing the same in a direction of travel athwart that of said first one of said brake shoes to urge said other of said brake shoes toward said disk, said second formation being angularly offset about the pivotal axis of said actuating lever from said first formation by an angle less than 180°.

2. A disk brake comprising a rotatable brake disk; a relatively stationary support extending along opposite sides of said disk; a pair of brake shoes movably mounted on said support for displacement toward said disk on opposite sides thereof; guide means for each of said brake shoes defining therefor a respective guide path inclined to said disk in the direction of displacement thereof, said paths including an angle of less than 180° between them; an actuating lever pivotally mounted on said support on one side of said disk for angular displacement in a plane transverse to said disk about a pivotal axis fixed with respect to the latter, said lever having a first formation rigid with said lever and in engagement with a corresponding one of said brake shoes for urging it toward said disk upon displacement of said lever; and a yoke shiftable with respect to said support and bridging the opposite sides of said disk while engaging the other of said brake shoes, said axis being offset from the path of said yoke but parallel thereto said lever having a second formation angularly spaced from said first formation about said axis by an angle of less than 180° and rigid with said lever, said second formation engaging said yoke on said one side of said disk for displacing said yoke to urge said other of said brake shoes toward said disk.

3. A disk brake comprising a rotatable brake disk; a relatively stationary support extending along opposite sides of said disk; a pair of brake shoes movably mounted on said support for displacement toward said disk on opposite sides thereof; guide means for each of said brake shoes defining therefor a respective guide path inclined to said disk in the direction of displacement thereof, said paths including an angle of less than 180° between them; an actuating lever swingably mounted on said support on one side of said disk for angular displacement in a plane transverse to said disk about a pivotal axis fixed with respect to the latter and having a first integral formation in engagement with a corresponding one of said brake shoes for urging it toward said disk upon displacement of said lever; an actuating cylinder rigid with said support and formed with an inlet for a fluid under pressure; a piston shiftable in said cylinder for displacement by said fluid and articulated to said lever for actuating same; and a yoke shiftable with respect to said support in a path inclined at an angle to said disk and bridging the opposite sides of the latter while engaging the other of said brake shoes, said axis being offset from the path of said yoke but parallel thereto, said lever having a second integral formation angularly spaced from said first formation and engaging said yoke on said one side of said disk for displacing said yoke to urge said other of said brake shoes toward said disk.

4. A disk brake comprising a rotatable brake disk; a relatively stationary support extending along opposite sides of said disk; a pair of brake shoes movably mounted on said support for displacement toward said disk on opposite sides thereof; respective guide means on said support inclined toward said disk in the direction of rotation thereof and forming inclined paths for said shoes including between them an angle of less than 180° whereby said disk wedges said shoes against said support upon displacement of said shoes against said disk; an actuating lever swingably mounted on said support on one side of said disk for angular displacement about a pivotal axis fixed with respect to the latter and in engagement with a first one of said brake shoes for urging it toward said disk upon displacement of said lever; and a yoke shiftable with respect to said support and bridging the opposite sides of said disk while engaging the other of said brake shoes, said axis being offset from the path of said yoke but parallel thereto, said lever being provided with a first and second formation angularly spaced about said axis, one of said formations engaging said yoke for displacing same to urge said other of said brake shoes toward said disk the other of said formations bearing upon said one of said brake shoes.

5. A disk brake comprising a rotatable brake disk; a relatively stationary support extending along opposite sides of said disk; a pair of brake shoes movably mounted on said support for displacement toward said disk on opposite sides thereof; respective guide means on said support inclined toward said disk in the direction of rotation thereof and forming mutually inclined paths for said shoes including between them an angle of less than 180° whereby said disk wedges said shoes against support upon displacement of said shoes against said disk; an actuating lever pivotally mounted on said support on one side of said disk for angular displacement about an axis fixed with respect to the latter and having a first rigid formation at a point spaced from said axis and in engagement with a corresponding one of said brake shoes for urging it toward said disk upon displacement of said lever; a fluid-operated cylinder having a pair of relatively movable members mounted upon said support, one of said members being rigid with said support, the other of said members being articulated to said lever for displacing same; and a yoke shiftable with respect to said support in a path inclined at an angle to the surface of said disk and bridging the opposite sides of said disk while engaging the other of said brake shoes, said axis being offset from the path of said yoke but parallel thereto, said lever having a second rigid formation at a point spaced from said axis and engaging said yoke on one side of said disk for displacing said yoke to urge said other of said brake shoes toward said disk, said second formation being angular offset about the pivotal axis of said actuating lever from said first formation by an angle less than 180°.

References Cited by the Examiner

UNITED STATES PATENTS

| | | | |
|---|---|---|---|
| 2,815,092 | 12/57 | Baselt | 188—52 |
| 3,137,368 | 6/64 | Press et al. | 188—73 |

FOREIGN PATENTS

| | | |
|---|---|---|
| 1,019,873 | 11/57 | Germany. |
| 1,174,269 | 11/58 | France. |
| 1,194,525 | 5/59 | France. |
| 1,241,774 | 8/60 | France. |

ARTHUR L. LA POINT, *Primary Examiner.*

EUGENE G. BOTZ, *Examiner.*